United States Patent Office 3,151,735
Patented Oct. 6, 1964

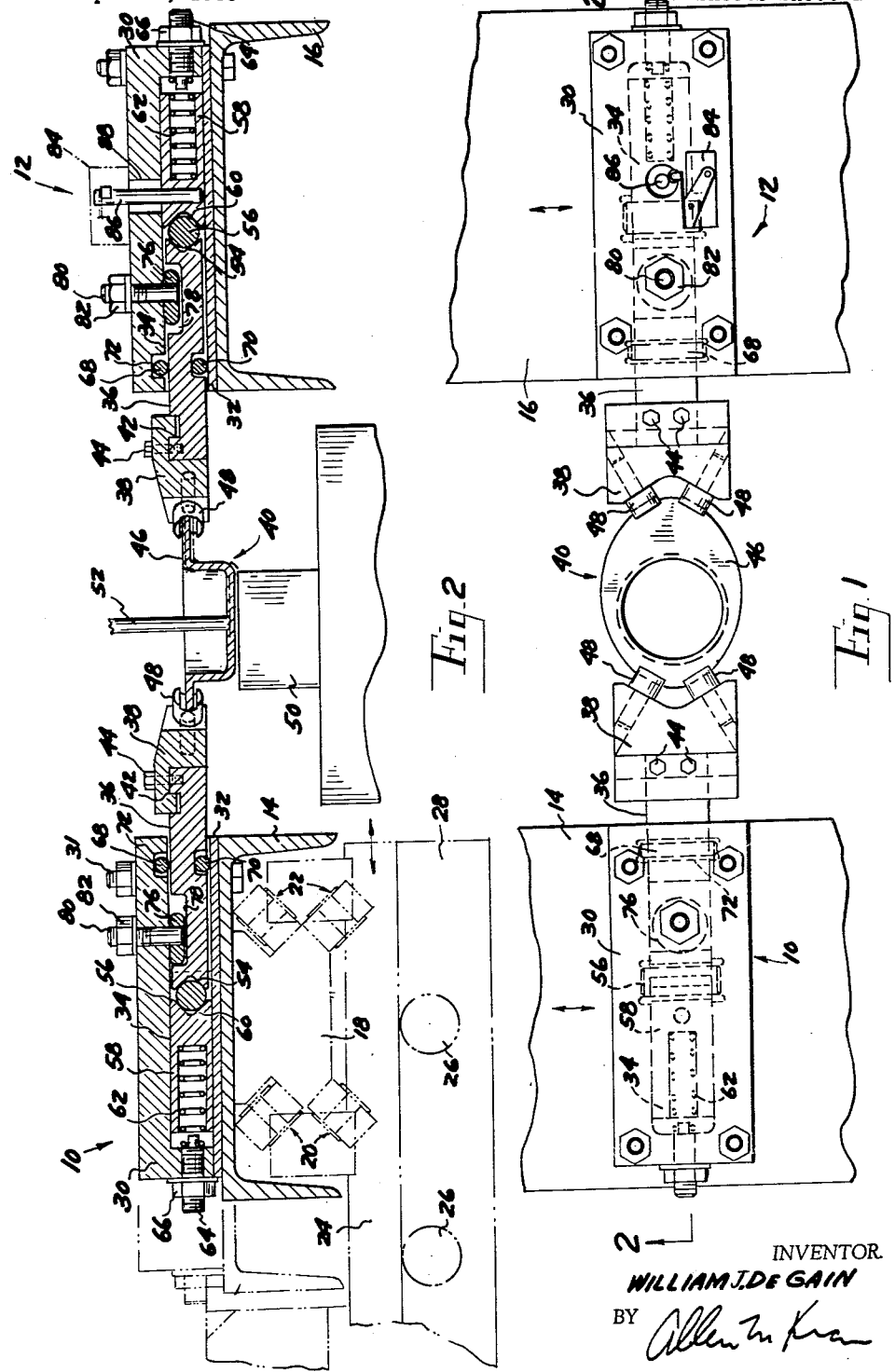

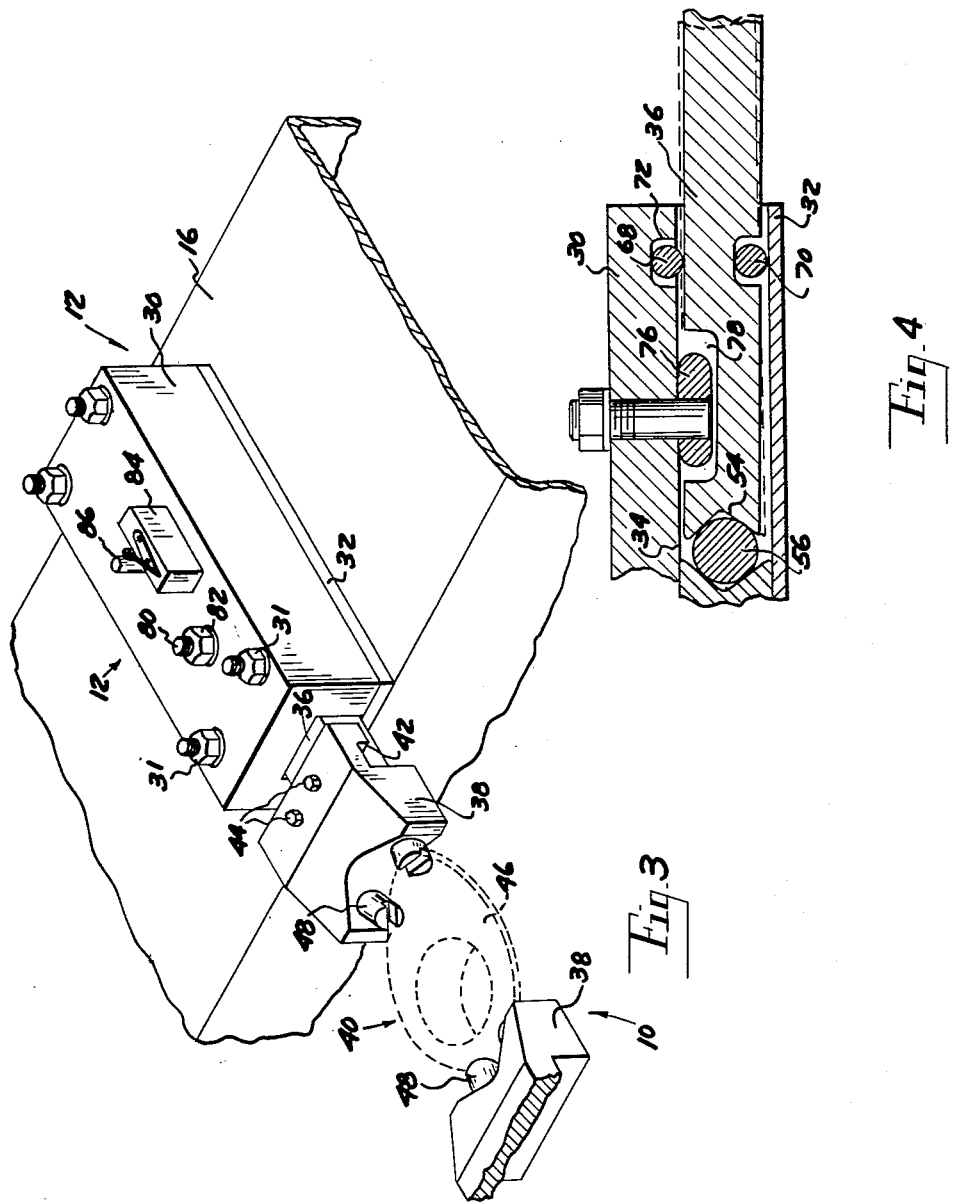

3,151,735
WORK ENGAGING FINGERS FOR TRANSFER
MECHANISM
William J. De Gain, Detroit, Mich., assignor to Koppy
Tool & Die Company, Ferndale, Mich., a corporation of
Michigan
Filed Apr. 8, 1963, Ser. No. 271,312
7 Claims. (Cl. 198—218)

This invention relates to transfer mechanisms employed in production machinery, and more particularly to a novel construction of work engaging fingers for a transfer mechanism.

Walking beam transfer mechanisms are commonly employed to move a plurality of parts through a series of stations, such as those presented by a progressive die. They employ a pair of elongated bars which are disposed parallel to one another on opposite sides of the path along which a part is to be moved. A plurality of sets of fingers are disposed at spaced points along the bars, so that the fingers face one another. Appropriate mechanism moves the bars toward one another so that the fingers engage workpieces and then moves the bars along the workpiece path so that a part is carried between successive stations. The bars then separate so as to deposit the parts at the new operations and return to their initial position while retracted. Before the transfer fingers release a part in a new position, a pin or rod associated with the die or fixture moves down on the part to engage it while it is being operated on. This mechanism also retains the part in position over the die until after it is grasped by the fingers for the next transfer operation. It is desirable that the fingers grasp the part in its position under the pin, raise it slightly when the pin is released so that it clears any obstructions on the die, and then move it to the next transfer position. This requires that the arms pivot about the transfer bar, so as to adjust to the exact position of the part. The transfer bar cannot pivot to suit one improperly positioned finger without providing unwanted movement to all the other fingers.

It is therefore a primary object of the present invention to provide work engaging fingers which may be used with walking beam loaders to provide a lifting force to parts so as to raise them above their rest position in a fixture or die when the restraining members release the part, without moving the transfer bar.

The fingers are designed to have a normal rest height, but are supported so that they are free to deflect downwardly to engage a part under forces exerted between the part and the fingers as the fingers are moved inwardly to engage the part. When the pressure on the part is released, the fingers are allowed to rise to their normal height. A part may then be transferred to a successive operation without dragging on the die surface.

In a preferred embodiment of the present invention, which will be subsequently described in detail, the fingers are supported so as to be free to move inwardly and outwardly and to pivot downwardly or upwardly to engage a part by a unique self-centering mechanism. This mechanism employs a pair of rollers disposed at opposite sides of the finger which act as a movable pivot point. The end of the finger adjacent the bar is engaged by a roller which is spring loaded so as to be biased in the direction of finger to provide a self-centering action of the finger about this pivot point, and also allow it to move inwardly and outwardly with respect to the part.

It is therefore seen to be another object of the persent invention to provide transfer fingers which are attached to a transfer bar by means of a mechanism which allows the fingers to pivot and yet provides self-centering action to their movement.

Other objects, advantages and applications of the present invention will be made apparent by the following detailed description of a preferred embodiment of the invention. The description makes reference to the accompanying drawings in which:

FIGURE 1 is a plan view of a set of the novel fingers, attached to transfer bars, and shown engaging a typical workpiece;

FIGURE 2 is an elevation sectional view of the fingers of FIGURE 1 taken along line 2—2 of FIGURE 1;

FIGURE 3 is a perspective view of a finger, partly broken away; and

FIGURE 4 is an enlarged sectional view taken along line 2—2 in FIGURE 1 showing the pivoting action of the fingers.

Referring to the drawings, a pair of fingers generally indicated at 10 and 12 are supported in opposition to one another on a pair of parallel transfer bars 14 and 16. The bars extend parallel to one another on opposite sides of the path followed by a part. A plurality of sets of fingers may be disposed on the bar at regular intervals equal to the space between sucessive part positions. The bars are adapted for movement toward and away from one another so as to grasp and release parts and for reciprocating movement in the direction of their extension, so as to transfer parts between successive operations and return to their initial position.

The mechanism for actuating the bars is well known and does not form a part of the present invention. However, FIGURE 2 discloses the manner in which the bar 14 is supported for its two movements. The bar 14 takes the form of an inverted channel section. A support member 18 is attached to the under side of the web section and projects downwardly therefrom. It is journaled in two sets of roller bearings 20 and 22 which allow it to move in the direction of the bars' extension. The bearings 20 and 22 are rotatably supported in a block 24 which is in turn supported for movement in a direction peripendicular to the direction of extension of the bars on a pair of rollers 26 which are retained in a lower support member 28. The mechanism which powers the bars 14 and 16 (not shown) is such that the two bars 14 and 16 move toward and away from one another and in their direction of extension, in perfect synchronism.

The fingers 10 and 17 are substantially similar to one another and similar numbers are used to identify identical parts on the two.

The fingers are supported in housings 30 which are fixed to the upper sides of the transfer bars 14 and 16 by bolts 31. The housings 30 are generally rectangular and are formed with detachable base plates 32. They are supported on the bars so that their central axes extend toward one another. They have central rectangular cavities 34 which open on the opposing sides of the housings. The base plates 32 form the lower side of these cavities. Rectangular finger bars 36 are disposed within these cavities 34 and are free to move linearly within the cavities. The bars 36 are of smaller dimensions than the cavities 34 so that they may be cocked from a coaxial position within the cavities.

The finger bars 36 extend out of the cavities and at their ends adjacent to one another they carry removable fingers 38 which attach to the bars by means of mating slots 42 and bolts 44. The fingers are specifically designed for the particular workpiece 40 being carried by the transfer bars. The exact configuration of the fingers 38 may vary between successive sets of fingers supported on the same bars in accordance with the variation in the part configuration as a result of the operations performed thereon. The part to be carried by the set of fingers which is disclosed is generally cup-shaped with an oval off-set rim 46. The fingers 38 are designed to grasp opposed edges of this rim.

The fingers each employ a pair of slotted buttons 48. The buttons are disposed in the opposed surfaces of the fingers at angles with respect to the centerlines thereof so as to be inclined toward one another. They are adapted to engage opposed sides of the oval rim 46.

The part 40 is adapted to be supported on a work station 50. A retractable pin 52 is supported for vertical movement above the part and it descends on the interior of the part to press it against the support 50. The pin 52 lifts out of the way after the part is engaged by the fingers so as to allow the fingers to move the part to a successive station.

The fingers 38 are moved in the direction toward one another by the bars 14 and 16 in order to grasp a part and the construction of the fingers and the buttons 48 is such that the contact between the part and the button causes a force to be exerted on the fingers which tends to cock them downwardly. The finger support is capable of allowing such a movement, as will be subsequently described. The ends of the finger bars 36 opposite to those which contain the fingers 38 are disposed within the cavity 34 in the housing 30. These ends contain V-shaped grooves 54 having their apexes lying in the horizontal plane. Rollers 56 abut the grooves 54 and are pressured against the grooves by backup bars 58 which have similar V-shaped grooves 60 at their ends. The backup bars 58 are pressured against the rollers 56 by springs 62 which have one end disposed in central cavities in the bars, and their other ends abutting adjustment screws 64. The adjustment screws extend through one end of the housings 30 and are locked in place by nuts 66.

The rollers 56 tend to maintain the finger bars 36 in alignment with the backup bars 58. This alignment is maintained with the apexes of the V-grooves 54 in the center of the cavity 34. However, this spring-biased centering arrangement allows the end 54 of the finger bars 36 to move up or down until they abut the walls of the cavities 30 in response to forces exerted on the fingers 38.

The finger bars 36 are pivoted about a rolling center formed by pairs of rolls 68 and 70. The rolls 68 are disposed in rectangular grooves 72 extending across the width of the top walls of the cavities 34 adjacent to the open ends of the cavities. The grooves 72 have a depth less than the diameter of the rollers 68 so that the rollers extend below the top walls of the cavities 34 and bear against the upper surfaces of the finger bar 36. The grooves 72 have a sufficient width to allow the rolls 68 to move in the horizontal direction. Similarly, the lower rolls 70 are disposed in grooves formed in the lower side of the finger bars 36. The rollers 68 and 70 allow the finger bars 36 to have a degree of freedom in the horizontal direction and still maintain a pivot point with respect to the housing 30. Since the centers of the rolls 68 and 70 only move half as much the equivalent movement of the finger bar 36, the pivot point only varies slightly with the axial movement of the bar 36.

The axial motion of the bars 36 is limited by eccentric stops 76 which are positioned within a groove 78 formed in the upper face of the finger bars 36 within the cavities 34. The eccentrics 78 are supported against the upper walls of the cavities 34 by bolts 80 which pass through the wall and nuts 82 which tighten the bolts and the eccentrics. By adjusting the positions of the eccentrics the freedom of travel of the finger bars 36 in the axial direction is adjusted. The fingers 10 and 12 differ from one another in two respects. First the spring 62 employed in the finger 12 is more easily compressible than the similar spring 62 employed in the finger 10.

Therefore an equal force exerted on both fingers as by their moving in on opposite sides of a part, will cause the finger 12 to retract rather than the finger 10. The outward position of the finger 10 thus provides a registration point for the die setup.

The second difference between the fingers is that the finger 12 has means for detecting the presence or absence of a part in the fingers. This constitutes a limit switch 84 which is supported on top of the housing 30 of the finger 12, and a pin 86 having its lower end fixed in the backup bar 58 and its upper end extending through an aperture 88 in the housing 30 so as to make contact with the arm of the limit switch 84. Limit switch 84 is a double throw variety and provides electrical signals which positively identify the position of the pin 86 and therefore the existence of a part in the fingers.

The operational sequence of the device will be described begining when the operation performed in the support 50 has been completed on the workpiece 40 and the workpiece is to be moved to the next station. The transfer bars 14 and 16 first move toward one another so as to bring all of the sets of fingers into contact with their respective parts. The part 40 is held down by the pin 52 so that it is slightly below the level at which it is to be supported by the fingers 10 and 12 for movement to the next station. In practice, only a very slight elevation of the part is required and between .002–.030 inch is deemed sufficient.

As the buttons 48 make contact with the rim 46 of the workpiece 40 a force is exerted on the tips of the fingers to cause them to move into alignment with the lowered workpiece. This force is created by the specific curved configuration of the buttons 48 which must be individually designed for each workpiece. This force causes the finger bars 36 to pivot about the rollers 68 and 70.

It may cause them to move either upwardly or downwardly due to variations in the part position from the ideal. The roller 56 allows this misalignment to take place, but exerts the force of the springs 62 onto the grooves 54 so as to bias the fingers 36 toward a medium position. The finger bar 36 of the finger 12 moves back against its spring 62 causing the pin 86 to actuate the limit switch 84 in such a manner as to indicate that a part is present in the fingers.

Prior to the initiation of the axial movement of the transfer bars 14 and 16 the rod 52 is raised so as to allow the workpiece 40 to be moved upwardly or downwardly a sufficient distance to satisfy the centering efforts of the rollers 56. The transfer bars 14 and 16 are next moved axially so as to transfer the workpiece to the next station. They then separate to allow a workpiece to remain in that station. Simultaneously another pair of fingers have brought a new part to the support 50.

Having thus described my invention, I claim:

1. In a part transfer mechanism including a pair of horizontal transfer bars adapted for movement toward and away from one another in the directions of their length, finger assemblies adapted to be retained on opposed points on the bars to grasp parts, each of said assemblies including: a finger bar; a finger adapted to grasp a workpiece disposed on one end of said bar; a housing disposed on the transfer bar and adapted to encompass the end of said finger bar opposite to that which carries said finger; and means contained in said housing for supporting said finger bar in such a manner that the finger bar extends in a generally horizontal plane perpendicular to the length of the transfer bar, has a freedom of movement along its length, is biased toward an outward extending position from said transfer bar, is pivotable about a horizontal axis perpendicular to its length disposed in said housing, and is biased toward a horizontal position with respect to said pivotable movement.

2. In a transfer mechanism having a pair of transfer bars disposed parallel to one another and adapted for movement toward and away from one another and in the direction of their length, finger assemblies adapted to be supported on the transfer bars to grasp parts to be moved, each of said finger assemblies comprising: a housing supported on a transfer bar; an elongated finger bar supported in said housing for axial movement, said finger bar extending perpendicularly to the extension of the transfer bar; a finger member adapted to contact a part disposed at one end of said finger bar; pivotal support means disposed in said housing and contacting said finger bar so as to allow the finger bar to pivot about a horizontal axis perpendicular to its extension; and spring means disposed in said housing abutting the end of said finger bar opposite to that which supports said finger, urging said finger bar toward movement in its axial direction and additionally urging said finger bar toward a central position with respect to its axis of pivoting.

3. In a part transfer mechanism which includes a pair of elongated transfer bars disposed parallel to one another and adapted for movement toward and away from one another and in the direction of their lengths, finger assemblies operative to be supported on opposed points on each of the transfer bars, each of such assemblies including: a housing disposed on the transfer bar; an elongated finger bar having one end disposed within said housing and extending perpendicularly to the axis of the transfer bar; a finger adapted to grasp a part disposed on the end of the finger bar away from the housing; and means for supporting the other end of said finger bar within said housing, said means including a pivotable support for said finger bar within said housing, spring means biasing said finger bar toward movement out of said housing, stop means operative to restrain the movement of the finger bar out of the housing, and centering means operative to bias said finger bar toward a central position with respect to said pivotable support.

4. The structure of claim 3 in which the pivotable support for said finger bar within said housing comprises a pair of rolls disposed parallel to one another with their axes in the horizontal plane, one between the top of the finger bar and the housing and the other between th bottom of the finger bar and the housing, said rollers being supportd within said housing so as to undergo a rotational movement in response to an axial movement of said finger bar.

5. The structure of claim 3 wherein the centering means operative to bias the finger bar toward a central position with respect to said pivotable support comprises a V-groove in the finger bar at its end disposed within said housing; a roller abutting said V-groove; and spring means for urging said roller toward a central position within said housing.

6. In a part transfer mechanism which includes a pair of elongated horizontal transfer bars disposed parallel to one another and adapted for movement toward and away from one another and in the direction of their lengths, finger assemblies operative to be supported on opposed points on each of said transfer bars, each of such assemblies including: a housing disposed on the transfer bar; an elongated finger bar having one end disposed within said housing and extending perpendicularly to the axis of the transfer bar; a finger adapted to grasp a part disposed on the end of the finger bar away from said housing; a pivotable support for said finger bar within said housing, said support comprising a pair of rollers disposed parallel to one another, with their axes horizontal, one above and one below said finger bar, said rollers being supported within said housing so as to allow limited rotational movement in response to axial movement of said finger bar; a V-groove at the end of the finger bar disposed within said housing; a roller abutting said V-groove; a backup bar disposed within said housing having a V-groove at one end thereof, said end abutting said roller; and spring means urging said backup bar against said roller so as to bias the finger bar toward movement out of said housing, and toward a central position with respect to said pivotable support.

7. In a part transfer mechanism which includes a pair of horizontal transfer bars disposed parallel to one another and supported for movement toward and away from one another and in the directions of their length, finger assemblies disposed on opposed points on the transfer bars adapted to extend perpendicularly to the bars so as to grasp a part when the bars are moved toward one another, carry the part when the bars are moved in one direction of their lengths, and drop the part when the bars again move away from one another, each of said finger assemblies comprising: an elongated finger bar; a finger disposed at one end of said finger bar; housing disposed on the transfer bar; a central cavity in said housing encompassing the end of the finger bar opposite to that which carries said finger; a pair of horizontal rolls disposed parallel to one another in said housing with their central axes parallel to the extension of said transfer bars, said rollers having a freedom of rotational movement within the housings and each having a line contact with said finger bar so as to provide it with a movable pivotable axis; and spring means, supported in said housing and abutting the end of said finger bar opposite to that which carries said finger, said spring means being adapted to bias said finger bar in a direction out of said housing and also to a medium, horizontal position with respect to the pivot point provided by said rolls.

References Cited in the file of this patent
UNITED STATES PATENTS
2,929,485    Wallis _____ Mar. 22, 1960